(No Model.) 3 Sheets—Sheet 1.
W. B. PATTERSON.
AUTOMATIC GRAIN WEIGHER AND REGISTER.

No. 285,921. Patented Oct. 2, 1883.

WITNESSES:
Fred. G. Dieterich
Victor Evans

INVENTOR.
Wm Bell Patterson
By DeWitt C. Allen
ATTORNEY (No Model.) 3 Sheets—Sheet 2.
W. B. PATTERSON.
AUTOMATIC GRAIN WEIGHER AND REGISTER.

No. 285,921. Patented Oct. 2, 1883.

WITNESSES:
Fred. G. Dieterich
Victor Evans

INVENTOR.
Wm Bell Patterson
By DeWitt C. Allen
ATTORNEY (No Model.) 3 Sheets—Sheet 3.

W. B. PATTERSON.
AUTOMATIC GRAIN WEIGHER AND REGISTER.

No. 285,921. Patented Oct. 2, 1883.

WITNESSES:
Fred. G. Dieterich
Victor Evans

INVENTOR.
Wm Bell Patterson
By DeWitt C Allen
ATTORNEY

UNITED STATES PATENT OFFICE.

WILLIAM B. PATTERSON, OF SECOR, ILLINOIS.

AUTOMATIC GRAIN WEIGHER AND REGISTER.

SPECIFICATION forming part of Letters Patent No. 285,921, dated October 2, 1883.

Application filed April 17, 1883. (No model.)

*To all whom it may concern:*

Be it known that I, WILLIAM BELL PATTERSON, of Secor, in the county of Woodford, and in the State of Illinois, have invented certain new and useful Improvements in a Combination Grain-Elevator and Automatic Weigher and Register; and I do hereby declare that the following is a full, clear, and exact description thereof, reference being had to the accompanying drawings, and to the letters of reference marked thereon, making a part of this specification, and in which—

Figure 1:
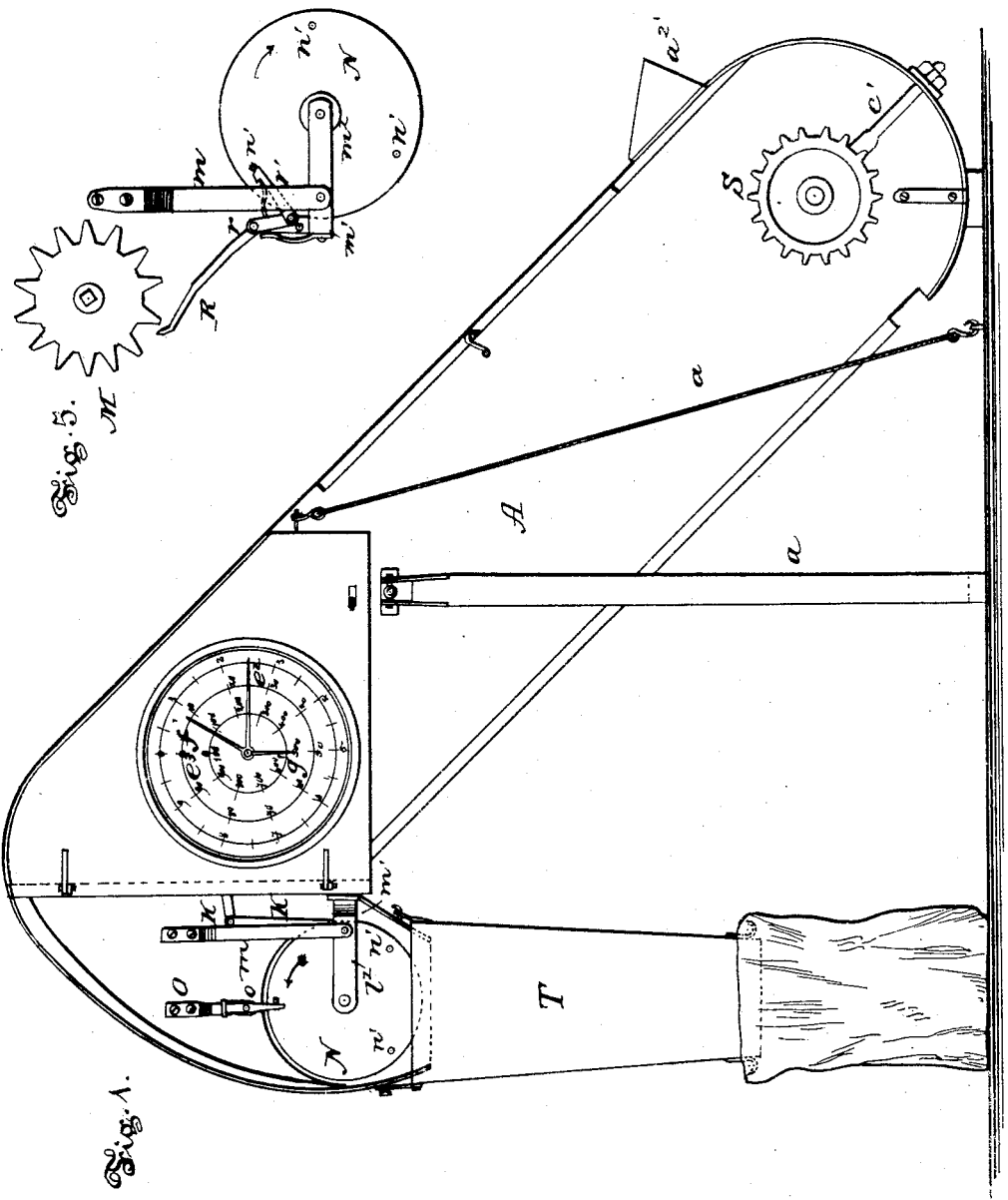
Figure 2:
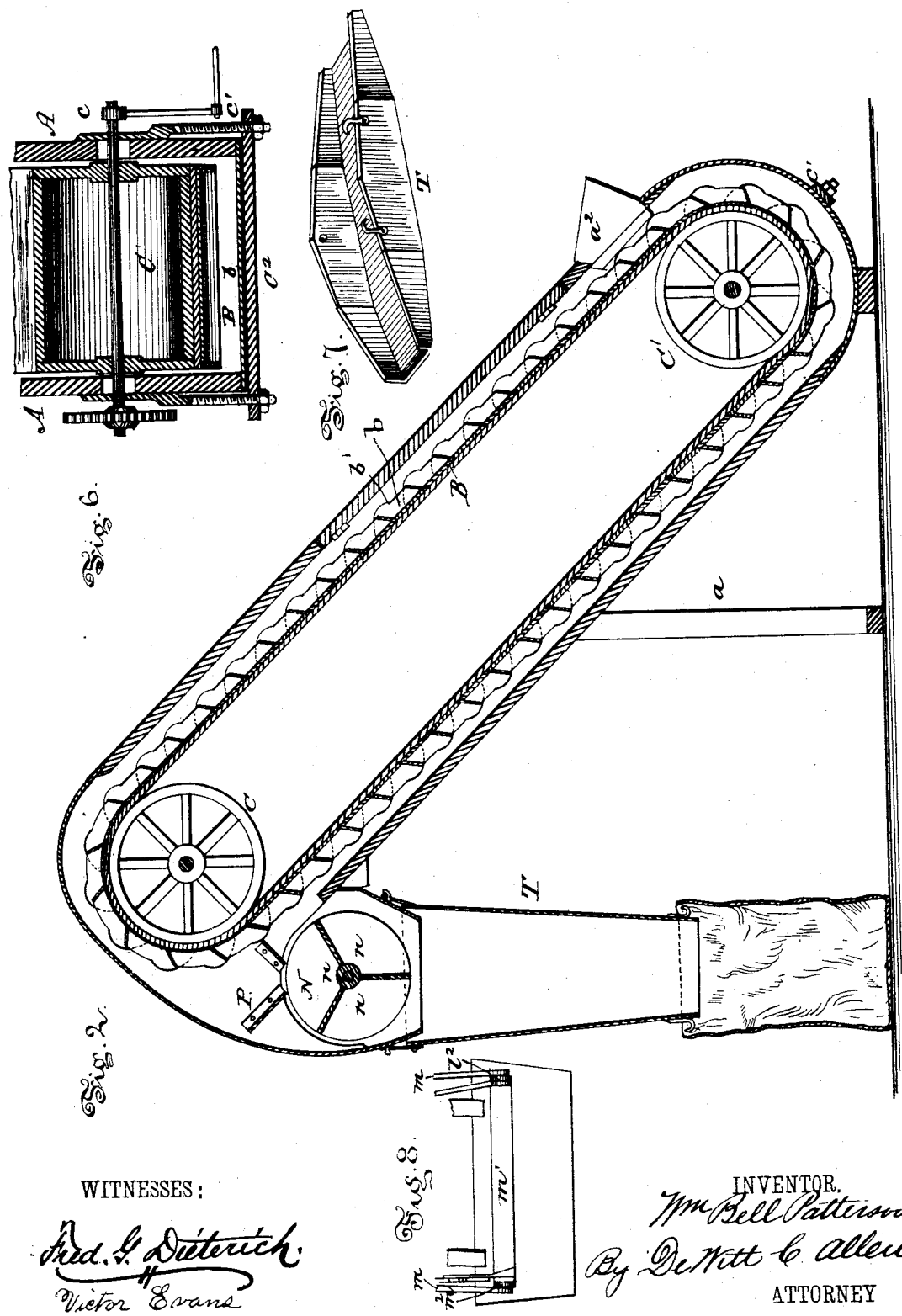
Figure 3:
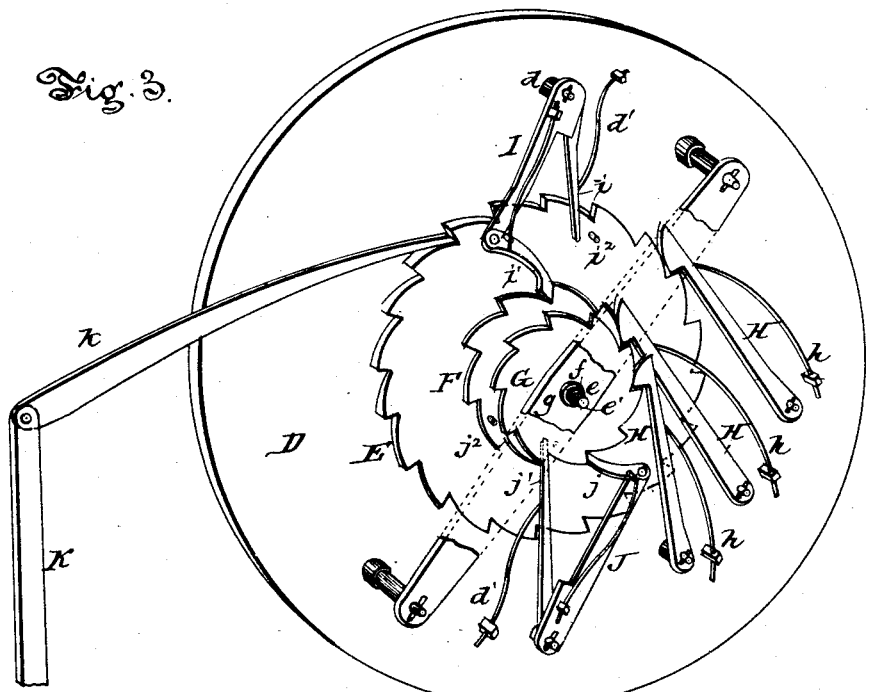
Figure 4:
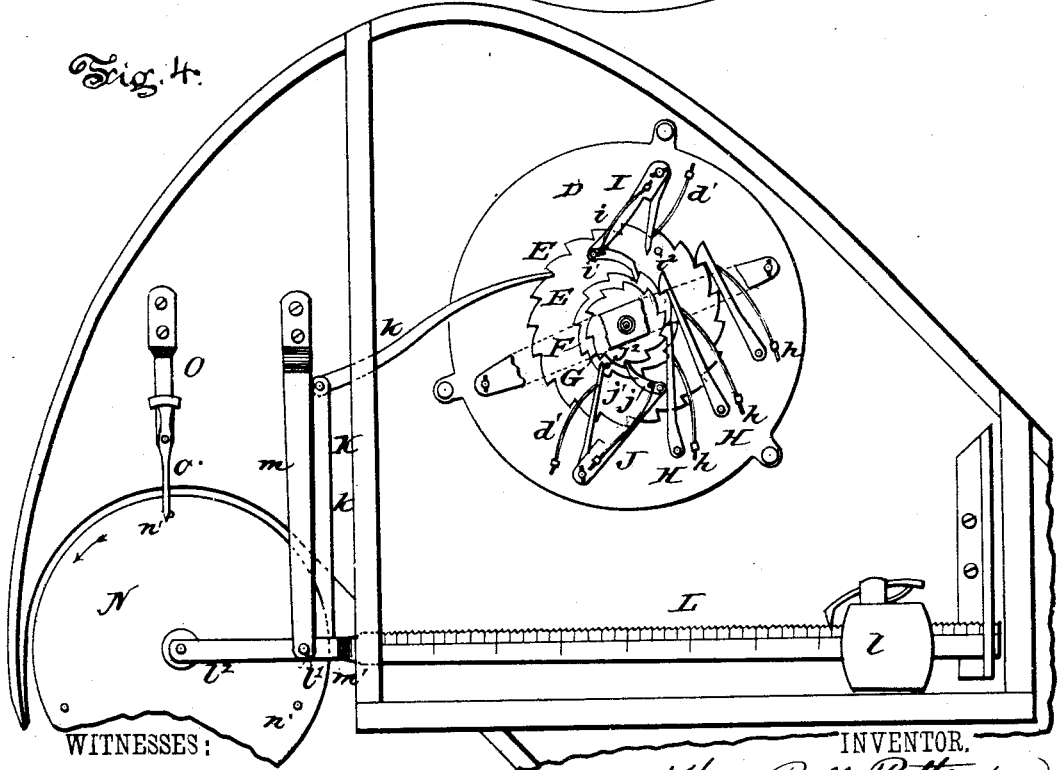

Figure 1 is a side elevation, partly in section, of my improved apparatus; Fig. 2, a longitudinal vertical section; Fig. 3, a view in perspective of the registering mechanism; Fig. 4, a side elevation of weighing and registering mechanism; Fig. 5, a side elevation of mechanism for operating the measure or receptacle; Fig. 6, a detail section through lower end of elevator; Fig. 7, a view in perspective of one of the discharge-spouts; Fig. 8, a detailed view to be hereinafter referred to.

This invention relates to certain new and useful improvements in a combined grain-elevator and automatic weighing and registering apparatus, more especially designed for use in connection with a thrashing-machine; and to this end the invention consists in novel features of construction and combination and arrangement of parts, all as will be hereinafter fully described, and set forth in the claims hereto annexed.

In the drawings, A represents the inclosing-case of the elevator supported in an elevated position by uprights $a$ and stay-ropes $a'$, and which case is provided with a hopper, $a^2$, through which the grain is discharged into the cups $b$, mounted or secured on an endless band, B, adapted to be moved around rollers C C', arranged, respectively, at the upper and lower ends of the elevator, the roller C' being mounted in adjustable bearings $c$, operated by screw-bolts and nuts $c'$, connected by a cross-bar, $c^2$, all as clearly shown in Figs. 2 and 6. The cups $b$ have overlapping end projections, $b'$, to prevent grain from falling out at the ends of the cups over the sides of the belt in passing over the upper roller until it is dumped.

The registering and weighing mechanism is arranged at and in the upper end of the elevator, and which I will now proceed to describe.

D represents a large disk attached to one side of the elevator-spout, and forming the back part of the inclosing-case and a support for the several parts of the registering mechanism.

E represents a large ratchet-wheel provided with twenty ratchet-teeth, and mounted upon a solid central shaft, $e'$, attached to the disk D. The wheel E is provided with a thimble-shaft, $e$, which slips over the solid central shaft, $e'$, and is extended outside of the disk D, and has attached thereto the index-hand $e^2$, for indicating on the dial-plate $e^3$ the half-bushels of grain measured.

F represents a second ratchet-wheel provided with a larger thimble-shaft, $f$, adapted to slip over the thimble-shaft $e$ of wheel E, and is extended out a shorter distance than the thimble-shaft $e$, and carries an index-hand, $f'$, which registers one point for each revolution of the wheel E, the wheel F being of less diameter and provided with ten ratchet-teeth.

G represents a third ratchet-wheel, of less diameter than wheel F, but having the same number of teeth. This wheel G has also a thimble-shaft, $g$, adapted to slip over, but is shorter than the thimble-shaft $f$, and carries the shorter index-hand $g'$, which registers one point to each revolution of the wheel F.

H H H are pivoted hooked levers or keepers for retaining the wheels E F G until they are moved by mechanism to be hereinafter described, said levers being held in position by springs $h\ h\ h$.

I represents a pivoted lever fulcrumed on a lug, $d$, on one side of the disk D. This lever is provided at its lower end with a spring-pawl, $i$, engaging the teeth of the wheel F, and is also provided with a downwardly-projecting spring-arm, $i'$, designed to engage a pin, $i^2$, on the side of wheel E, at each revolution thereof, by which the wheel F is moved one tooth through the medium of pivoted lever I and pawl $i$. J represents a similar pivoted lever, having a spring-pawl, $j$, adapted to engage the teeth on wheel G, and a spring-arm, $j'$, adapted to engage a pin, $j^2$, on wheel F, at each revolution thereof, for moving wheel G one tooth.

$d'\ d'$ are springs connected to disk D, and bearing against levers I J, for returning them to their normal positions after having been operated upon by the pins $i^2$ and $j^2$.

L represents a pivoted scale-beam provided with the usual adjustable weight, $l$, said beam fulcrumed at the point $l'$ to the supporting-bar $m$, and its extended outer end, $l^2$, forming one of the bearings for the measure or receptacle N, to be hereinafter referred to. The scale-beam is connected near its pivotal point to the lower end of a bar, K, which has at its upper end a pivoted pawl, $k$, that engages the ratchet-wheel of the registering mechanism, all as clearly shown in Fig. 4. This scale-beam is also pivotally connected by a transverse bar, $m'$, (see Fig. 8,) to a similar supporting-bar, $m$, on the opposite side of the elevator, and which bar $m'$ has a right-angled projection, $m^2$, which forms the bearing for the measure or receptacle N. The measure or receptacle N, in the present instance, is divided into three transverse compartments, $n$, each of which is adapted to hold one half-bushel of grain, and has on its outer sides three projecting pins, $n'$, for a purpose to be hereinafter described.

M represents a notched wheel mounted upon the extended end of the shaft carrying the upper roller, C, which wheel M, in its revolution, strikes the upper end of a pivoted spring-lever, R, fulcrumed at the point $r$, and provided at its lower end with a pivoted spring-pawl, $r'$, that is adapted to engage the pins $n'$ on one side of the measure or receptacle N, all as clearly shown in Fig. 5. On the opposite side of the elevator-spout (see Fig. 1) is secured a bar, O, having a pivoted spring-arm, $o$, that engages the pins $n'$ on the opposite side of the measure or receptacle N, to prevent the same from revolving too far after it has dumped or discharged the grain from one of its compartments.

An intermediate distributing-hopper, P, is placed immediately above the measure or receptacle N, to receive and discharge the grain (carried up and discharged from the cups on the belt B) into said measure or receptacle. The object of this hopper is twofold: first to distribute the grain evenly into the measure or receptacle, and, secondly, to prevent the momentum of the falling grain from affecting the scale-beam. Spouts T, of the shape shown in Figs. 1 and 7, or of any suitable shape, may be connected to the conveyer-spout for receiving the grain from the measure or receptacle and discharging it into sacks, wagons, or bins.

When my improved apparatus is used in connection with a thrashing-machine, the design is to derive the power through a sprocket-belt that runs over a sprocket-wheel, S, (see Figs. 1 and 6,) that may be placed on either side of the elevator. A sprocket wheel and belt are preferred, as said belt can be run slack, and thus obviate any vibration being communicated from the thrashing-machine to the elevator, which might have a tendency to affect the registering and weighing mechanism.

Having thus fully described my invention, I will now proceed to set forth the operation of the same, which is as follows: When the measure or receptacle is sufficiently filled with grain to overbalance the weighted scale-beam, said measure or receptacle, in its downward or revolving movement, carries with it the lower end of lever R, causing its upper end to come in contact with the teeth of wheel M. This engagement throws pawl $r$ against one of the pins $n'$ (see Fig. 5) and propels the measure forward in the direction indicated by the arrow (see same figure) and insures the discharge of the grain. When the grain is dumped, the beam and weight fall, which operates the registering mechanism through the medium of the bar K, connected to said beam, and the pawl $k$, engaging and operating ratchet-wheel E, which in turn communicates motion to the wheels F and G in the manner hereinbefore described. As the measure is emptied, or each compartment thereof, it is arrested in its further revolving movement by the spring-pawl $o$ engaging one of the pins $n'$, (see Fig. 1,) thus retaining the measure in proper position for the next compartment thereof to be filled.

What I claim as of my invention, and desire to secure by Letters Patent, is—

1. The combination, with the revolving measure or receptacle N, having a series of compartments, $n$, and stop-pins $n'$, of pivoted lever R, having spring-pawl $r'$, and the toothed wheel M, substantially as herein shown and described.

2. The combination, with the revolving measure or receptacle N, having a series of compartments, $n$, and stop-pins $n'$ at both of its ends, of the spring-pawl $o$, pivoted lever R, having spring-pawl $r'$, and the toothed wheel M, substantially as herein shown and described.

3. The combination, with a pivotal and weighted scale-beam carrying the revolving measure or receptacle N, with stops-pins $n'$, and registering mechanism, substantially as described, operated through the medium of said beam, of the pivoted lever R, having spring-pawl $r'$, and the revolving toothed wheel M, substantially as and for the purpose specified.

In testimony that I claim the foregoing I have hereunto set my hand this 2d day of March, 1883.

WILLIAM BELL PATTERSON.

Witnesses:
 THOS. SLADE,
 RICHARD GRAY.